United States Patent
Liu et al.

(10) Patent No.: US 12,316,558 B2
(45) Date of Patent: May 27, 2025

(54) DETERMINING UPLINK TRANSMISSION PARAMETERS BASED ON DOWNLINK INFORMATION

(71) Applicant: Telefonaktiebolaget LM Ericsson (publ), Stockholm (SE)

(72) Inventors: Chunhui Liu, Beijing (CN); Qi Zhang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 506 days.

(21) Appl. No.: 17/634,500

(22) PCT Filed: Aug. 13, 2019

(86) PCT No.: PCT/CN2019/100442
§ 371 (c)(1),
(2) Date: Feb. 10, 2022

(87) PCT Pub. No.: WO2021/026781
PCT Pub. Date: Feb. 18, 2021

(65) Prior Publication Data
US 2022/0286249 A1 Sep. 8, 2022

(51) Int. Cl.
*H04L 5/00* (2006.01)
*H04W 24/08* (2009.01)

(52) U.S. Cl.
CPC ........... *H04L 5/0048* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 2012/0213509 A1 | 8/2012 | Zhang et al. | |
| 2018/0183503 A1* | 6/2018 | Rahman | H04B 7/0645 |
| 2018/0287757 A1 | 10/2018 | Onggosanusi | |
| 2019/0081671 A1* | 3/2019 | Yang | H04B 7/0482 |
| 2019/0103907 A1* | 4/2019 | Yang | H04L 25/03898 |

FOREIGN PATENT DOCUMENTS

| | | |
|---|---|---|
| CN | 102291812 A | 12/2011 |
| CN | 103428778 A | 12/2013 |
| CN | 109792751 A | 5/2019 |

OTHER PUBLICATIONS

5G NR Radio Network Field Trial Specification—Multi Antenna Performance 5.0.0, China Mobile (obtained on or before May 28, 2019) (27 pages total).

(Continued)

*Primary Examiner* — Diane L Lo
(74) *Attorney, Agent, or Firm* — Rothwell, Figg, Ernst & Manbeck, P.C.

(57) ABSTRACT

Various embodiments of the present disclosure provide a method for transmission configuration. The method which may be performed by a network node comprises determining one or more uplink transmission parameters for a terminal device based at least in part on downlink information reported by the terminal device. The method may further comprise transmitting configuration information to the terminal device to indicate the one or more uplink transmission parameters.

16 Claims, 10 Drawing Sheets

(56) References Cited

OTHER PUBLICATIONS

International Search Report and Written Opinion with Notification of Transmittal dated Apr. 26, 2020 in International Application No. PCT/CN2019/100442 (9 pages total).
3GPP TS 38.331 V15.1.0, Mar. 2018, 3rd Generation Partnership Project; Technical Specification Group Radio Access Network; NR; Radio Resource Control (RRC) protocol specification (Release 15) (268 pages total).
5G NR Radio Network Field Trial Specification—Multi Antenna Performance 5.0.0, China Mobile (27 pages total).
Sampath, H. et al., Performance Analysis of Linear Precoding Based on Field Trials Results of MIMO-OFDM System, IEEE Transactions on Wireless Communications, vol. 4, No. 2, Mar. 2005, pp. 404-409 (6 pages total).

* cited by examiner

DETERMINING UPLINK TRANSMISSION PARAMETERS BASED ON DOWNLINK INFORMATION

CROSS REFERENCE TO RELATED APPLICATION

This application is a 35 U.S.C. § 371 National Stage of International Patent Application No. PCT/CN2019/100442, filed Aug. 13, 2019.

FIELD OF THE INVENTION

The present disclosure generally relates to communication networks, and more specifically, to method and apparatus for transmission configuration.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks are expected to achieve high traffic capacity and end-user data rate with lower latency. In order to meet dramatically increasing network service demands, one interesting option for communication technique development is to enable transmission configuration for a radio device to be adaptive to the changing network environment and different quality of service (QoS) requirements.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In a wireless communication network such as long-term evolution (LTE) and new radio (NR) network, measurements on channel conditions and signal quality may be used to perform channel estimation and transmission configuration. Sounding reference signals (SRSs) may be employed for measuring uplink (UL) channels. For example, a network node such as a base station can evaluate channel quality and determine transmission parameters according to the SRSs transmitted by a terminal device such as a user equipment (UE). The transmission of SRSs may consume UL radio resource (e.g., time resource and/or frequency resource) and possibly introduce interference affecting network performance. On the other hand, for a busy cell serving a large number of UEs, there may not be enough SRSs which can be configured for all connected UEs to implement the UL sounding. Therefore, it may be desirable to improve the use of SRS while maintaining the network performance and resource efficiency.

Various embodiments of the present disclosure propose a solution for transmission configuration, which can enable a network node to determine UL transmission parameters (e.g., a UL transmission rank, a transmission precoding matrix indicator (TPMI), etc.) for a terminal device with less or no SRS transmission, so that the limitation of SRS resource can be relaxed without complex system design and potential degradation of cell throughput.

According to a first aspect of the present disclosure, there is provided a method performed by a network node (e.g., a base station). The method comprises determining one or more UL transmission parameters for a terminal device based at least in part on downlink (DL) information reported by the terminal device. The method may further comprise transmitting configuration information to the terminal device to indicate the one or more UL transmission parameters.

In accordance with some exemplary embodiments, the terminal device may be configured by the network node to perform SRS transmission at a frequency lower than a first threshold. Optionally, the terminal device may be configured not to perform the SRS transmission.

In accordance with some exemplary embodiments, the determination of the one or more UL transmission parameters for the terminal device based at least in part on the DL information reported by the terminal device may comprise: determining the one or more UL transmission parameters, according to a map between the one or more UL transmission parameters and one or more DL transmission parameters indicated by the DL information (e.g., a map between DL rank/precoding matrix indicator (PMI) and UL rank/TPMI).

In accordance with some exemplary embodiments, the method according to the first aspect of the present disclosure may further comprise: receiving, from the terminal device, UL transmission to which the one or more UL transmission parameters may be applied.

In accordance with some exemplary embodiments, the method according to the first aspect of the present disclosure may further comprise adjusting the one or more UL transmission parameters, based at least in part on the received UL transmission from the terminal device.

In accordance with some exemplary embodiments, the method according to the first aspect of the present disclosure may further comprise informing the terminal device of the one or more adjusted UL transmission parameters.

In accordance with some exemplary embodiments, the method according to the first aspect of the present disclosure may further comprise: instructing the terminal device to transmit an SRS to the network node, in response that quality of the received UL transmission is lower than a second threshold.

According to a second aspect of the present disclosure, there is provided an apparatus which may be implemented as a network node. The apparatus may comprise one or more processors and one or more memories comprising computer program codes. The one or more memories and the computer program codes may be configured to, with the one or more processors, cause the apparatus at least to determine one or more UL transmission parameters for a terminal device based at least in part on DL information reported by the terminal device. According to some exemplary embodiments, the one or more memories and the computer program codes may be configured to, with the one or more processors, cause the apparatus at least further to transmit configuration information to the terminal device to indicate the one or more UL transmission parameters.

In accordance with some exemplary embodiments, the one or more memories and the computer program codes may be configured to, with the one or more processors, cause the apparatus according to the second aspect of the present disclosure at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a network node. The apparatus may comprise a determining unit and a transmitting unit. In accordance with some exemplary embodiments, the determining unit may be operable to carry out at least the determining step of the method according to the first aspect of the present disclosure. The transmitting unit may be operable to carry out at least the transmitting step of the method according to the first aspect of the present disclosure.

According to a fifth aspect of the present disclosure, there is provided a method performed by a terminal device (e.g., a UE). The method comprises receiving configuration information from a network node. The configuration information may indicate one or more UL transmission parameters which may be based at least in part on DL information reported to the network node by the terminal device.

In accordance with some exemplary embodiments, the method according to the fifth aspect of the present disclosure may further comprise: performing UL transmission to the network node by applying the one or more UL transmission parameters.

In accordance with some exemplary embodiments, the method according to the fifth aspect of the present disclosure may further comprise: obtaining one or more adjusted UL transmission parameters from the network node. The one or more adjusted UL transmission parameters may be based at least in part on the UL transmission of the terminal device received by the network node.

In accordance with some exemplary embodiments, the method according to the fifth aspect of the present disclosure may further comprise: receiving an instruction from the network node to transmit an SRS to the network node, in response that quality of the UL transmission of the terminal device received by the network node is lower than a second threshold. Optionally, the terminal device can transmit the SRS to the network node according to the instruction.

According to a sixth aspect of the present disclosure, there is provided an apparatus which may be implemented as a terminal device. The apparatus comprises one or more processors and one or more memories comprising computer program codes. The one or more memories and the computer program codes may be configured to, with the one or more processors, cause the apparatus at least to receive configuration information from a network node. The configuration information may indicate one or more UL transmission parameters which may be based at least in part on DL information reported to the network node by the terminal device.

In accordance with some exemplary embodiments, the one or more memories and the computer program codes may be configured to, with the one or more processors, cause the apparatus according to the sixth aspect of the present disclosure at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as a terminal device. The apparatus may comprise a receiving unit and optionally a performing unit. In accordance with some exemplary embodiments, the receiving unit may be operable to carry out at least the receiving step of the method according to the fifth aspect of the present disclosure. The performing unit may be operable to carry out at least the performing step of the method according to the fifth aspect of the present disclosure.

In accordance with some exemplary embodiments, there may be a map between the one or more UL transmission parameters and the one or more DL transmission parameters indicated by the DL information.

In accordance with some exemplary embodiments, the map between the one or more UL transmission parameters and the one or more DL transmission parameters may comprise: mapping from the one or more DL transmission parameters to the one or more UL transmission parameters, and a weight per mapping. Optionally, the weight per mapping may meet a specific criterion.

In accordance with some exemplary embodiments, the map between the one or more UL transmission parameters and the one or more DL transmission parameters can be determined according to statistical information related to UL transmission and DL transmission.

In accordance with some exemplary embodiments, the one or more UL transmission parameters for the terminal device may be further based at least in part on one or more of:

capability of the terminal device;
UL measurement for the terminal device;
UL power headroom of the terminal device;
DL transmission feedback from the terminal device;
a difference between UL transmission and DL transmission of the terminal device;
a difference between effective quality and estimated quality of the UL transmission of the terminal device; and
a type of a service for the terminal device.

In accordance with some exemplary embodiments, the one or more UL transmission parameters may comprise at least one of: an UL transmission rank and a TPMI.

In accordance with some exemplary embodiments, the terminal device may be equipped with one or more antennas of which a number is less than or equal to a third threshold. Optionally, the configuration information for the terminal device may indicate a TPMI which may be randomly selected by the network node for UL transmission of the terminal device.

In accordance with some exemplary embodiments, the map between the one or more UL transmission parameters and the one or more DL transmission parameters may be updated according to SRS measurement performed by the network node.

In accordance with some exemplary embodiments, the SRS measurement may be performed for one or more terminal devices scattered over a cell coverage of the network node.

In accordance with some exemplary embodiments, the SRS measurement may be performed periodically or as required.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
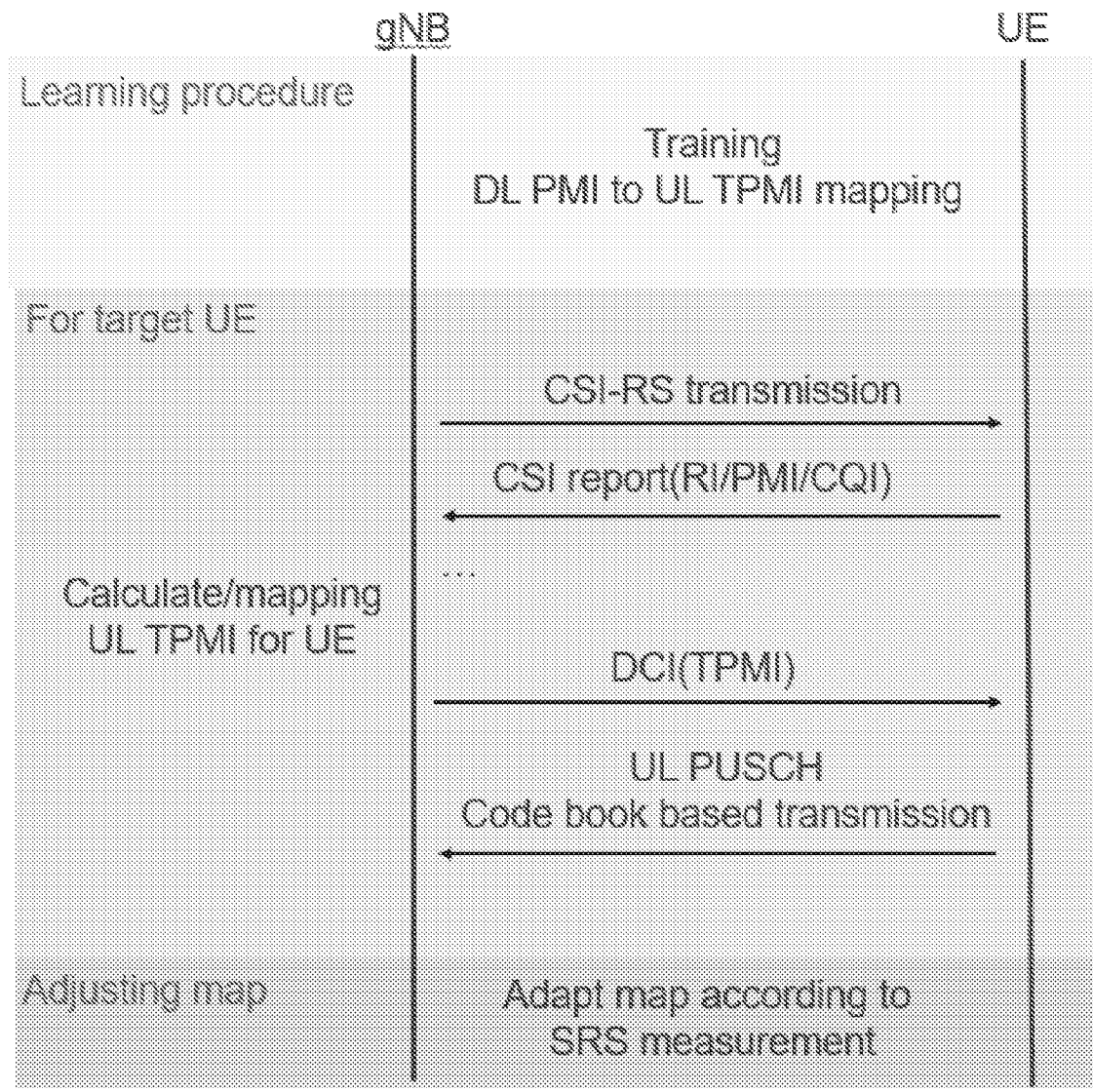
FIG. 1 is a diagram illustrating an exemplary transmission configuration procedure according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

From analog communication technologies through LTE, each generation of mobile technology is motivated by the need to address the challenges which are not overcome by its predecessor. The mobile technology such as 5G is positioned to address the demands and business beyond LTE. It is expected to enable a fully mobile and connected society, related to the tremendous growth in connectivity and density/volume of traffics that may be required in the near future.

In a wireless communication network such as 5G/NR network, UL sounding signals (e.g., sounding reference signals (SRSs)) may be employed for deriving channel quality by base stations. For example, a UL sounding signal may be used for UL codebook-based transmission, UL non-codebook-based transmission, UL beam management, etc. In addition, the UL sounding signal can be used for DL reciprocity-based transmission or DL non-codebook-based precoding as well. As an example, the UL sounding signal can be used for measuring the UL channel. If channel reciprocity is assumed, the UL channel parameters can be viewed as the same as the DL channel parameters. According to the channel estimates, base stations can determine the DL and UL beams towards UEs.

From the perspective of a UE, SRSs may consume UL radio resources to measure channels for UL transmission. The more frequently channels are measured, the more accurate channel parameters can be estimated due to time variation of channels. Since an SRS is generally used to determine parameters such as the rank and transmission precoding matrix indicator (TPMI) for UL transmission, the SRS may be required by each UE. However, SRS resources may be limited by the factors below.

The SRS bandwidth is required not to be too small, since the larger SRS bandwidth is, the smaller channel estimation errors become.

The time interval of SRS is required not to be too long if the channel changes frequently.

The more SRS resources are, the more the cell throughput is impacted.

Thus, during the system design, it may be desirable to carefully balance the amount of SRS resources and the benefit of SRS. The balance may depend on many factors such as UE traffic mode, UE channels, gNB processing capabilities and so forth.

In order to improve the resource utilization and system performance of a communication network, various exemplary embodiments of the present disclosure propose a solution for determining UL transmission parameters for a terminal device such as a UE in the case of less SRSs or no SRS, which can relax the limitations of SRS resources in a communication network and avoid the complex system design and potential degradation of cell throughput. According to some exemplary embodiments, a deterministic scheme, a learning scheme, or a combination thereof may be used to determine UL transmission parameters for a UE with less frequent transmission of SRSs or no transmission of SRS.

In accordance with some exemplary embodiments, the determination of the UL transmission parameters can be performed according to the deterministic scheme which may allow SRS transmission not be performed. In an exemplary embodiment, a terminal device such as a UE can send one or more channel quality reports for a DL channel. Based at least in part on the capability (e.g., the number of antennas, supported transmission mode, supported scheduling configuration, etc.) of the UE, a network node such as a base station can estimate UL transmission parameters for the UE, for example, according to the deterministic relationship or association between DL transmission parameters indicated by the one or more channel quality reports and the UL transmission parameters. Optionally, an outer-loop procedure between the base station and the UE may be employed to avoid severe estimation errors related to the UL transmission parameters. In the outer-loop procedure, the UE may perform UL transmission according to scheduling information which may indicate the estimated UL transmission parameters by the base station. In the case that the effective UL signal quality of the UE is lower than the estimated signal quality, the base station can adjust the estimates for UL transmission to reduce estimation errors.

In accordance with some exemplary embodiments, the determination of the UL transmission parameters can be performed according to the learning scheme. In an exemplary embodiment, SRSs may be used periodically to investigate UL channels. Based at least in part on the DL channel quality reports from UEs, a map between DL and UL transmission parameters can be built or derived by supervised machine learning. Then the UL transmission parameters can be determined according to the derived map. In accordance with some exemplary embodiments, the usage of SRSs for determination of UL transmission parameters can de reduced without muting SRSs in the communication network. In this case, at least a part of SRSs may be preserved for other purpose, e.g., for DL non-codebook-based precoding or DL reciprocity-based transmission.

With the increasing number of antennas for a UE in a wireless communication network such as 5G/NR network, the importance of SRS for multi-layer UL transmission is increased as well. As mentioned previously, SRS resources may be limited for supporting so many SRS usages. Various embodiments of the present disclosure may allow UL transmission parameters of a UE to be determined, e.g. without SRS transmission. According to some exemplary embodiments, the number of antennas at a base station may be much greater than the number of antennas used by a UE. The UL transmission parameters may comprise one or more UL channel parameters such as the UL transmission rank, TPMI, etc.

There may be still some issues to embed many antennas at a UE due to the limitations brought by the size of the UE and the battery life cycle. Thus, in the coming 5G/NR commercial deployment, it may be possible for a UE to employ a small number of antennas. For example, a popular UE antenna capability may be 2T4R, i.e., 2 UE transmission antennas and 4 UE receiving antennas.

In accordance with an exemplary embodiment, the number of antennas configured for a UE may be small (e.g., 4 antennas). Upon the reception of DL channel state information (CSI) reports including the rank indication (RI), a base station such as a gNB can determine the most probable best-fit rank for UL transmission, for example, based on the DL CSI reports and optionally UL measurement and UL power headroom reports. According to an exemplary embodiment, the base station can make an UL rank deduction from a DL CSI report, according to an association or a map between a DL rank and an UL rank, for example, as shown in Table 1.

TABLE 1

| DL Rank | the probability of UL rank = 2 | the probability of UL rank = 1 |
|---|---|---|
| 4 | 1 | 0 |
| 3 | 5/6 | 1/6 |
| 2-1 | 2/3 | 1/3 |
| 2-2 | 0.5 | 0.5 |
| 1 | 0 | 1 |

In accordance with an exemplary embodiment, a UE may be equipped with two transmission antennas and four receiving antennas, and a gNB can analyze and determine the probable best-fit rank for UL transmission of the UE as below.

- If the DL rank is reported as 4, it implies that all four antennas are well separated, then the gNB can determine that the UL rank is 2, which is the maximum UL rank.
- If the DL rank is reported as 3, it implies that three out of four antennas are well separated, while the last one is highly correlated with one of those three antennas. In this case, it has much higher probability that the UL rank is 2.
- If the DL rank is reported as 2, there may be two cases. Case 1 ("2-2" in table 1) is that two pairs of antennas are well separated, while the two antennas within each pair are highly correlated. Case 2 ("2-1" in table 1) is that one antenna is well separated with the other three, while those three antennas are highly correlated. According to the PMI reported by the DL CSI measurement, the gNB can distinguish the two cases. Then the gNB can determine the UL rank according to the associated probability and optionally the UL/DL measurement (e.g., transmission quality, signal to interference plus noise ratio (SINR), etc.). For example, for case 1, according to the table 1, the probability of UL rank=1 is same as the probability of UL rank=2. If the transmission quality is higher than a certain level, it is determined that UL rank=2, otherwise, UL rank=1.
- If the DL rank is reported as 1, it implies that four antennas are highly correlated, then the gNB can determine that the maximum UL rank is 1.

From the analysis above, the gNB may be able to determine the UL rank based on the DL CSI report. However, the determination may bring a rank estimation error, since the gNB may not know which antennas are used for UL transmission. Depending on different service requirements and device capabilities, there may be different implementations for determining an UL transmission parameter such as the UL rank.

In accordance with an exemplary embodiment, a gNB can select the most probable UL rank (e.g., UL rank=2) for a UE according to the association/map between the DL rank and the UL rank. Optionally, the gNB may adjust the UL rank determined according to the map between DL and UL ranks, by considering one or more factors which may affect rank estimation, for example, including but not limited to the following factors:

Hybrid automatic repeat request (HARQ) feedback

According to an exemplary embodiment, if the gNB receives negative acknowledgement (NACK) feedback from the UE, the gNB may adjust the determined UL rank by selecting the smaller UL rank (e.g., UL rank=1) for the UE.

Difference between DL transmission and UL transmission

According to an exemplary embodiment, if the difference (e.g., the SINR/power/interference difference) between DL transmission and UL transmission is above a specific difference threshold, the gNB may adjust the determined UL rank correspondingly.

Service type and/or service requirement

According to an exemplary embodiment, if the UE requires a service with a big buffer or a periodic service, the gNB may not adjust the determined UL rank. In the case that the UE requires a service with a small buffer or a non-periodic service, the gNB may adjust the determined UL rank by selecting a smaller UL rank conservatively.

Difference between the effective SINR and the estimated SINR

According to an exemplary embodiment, if the effective SINR is much lower than the estimated SINR, the gNB may adjust the determined UL rank by decreasing the UL rank. In the case that there is no significant difference between the effective SINR and the estimated SINR, the gNB may not adjust the determined UL rank.

In accordance with some exemplary embodiments, the gNB may assign or schedule SRS resources to actually measure UL channels, alternative to or in additional to the adjustment of the UL rank. In this case, the UE may perform SRS transmission for UL measurement.

It can be appreciated that the rank estimation error may be reduced if more factors affecting rank estimation are considered, although the rank estimation error may not be completely mitigated. In accordance with an exemplary embodiment, an outer-loop procedure may be performed to avoid errors. In this outer-loop procedure, the UE can perform UL transmission by using the UL rank selected by the gNB, and the gNB can determine whether to adjust the selected UL rank according to the quality of the received UL transmission from the UE. For example, if the quality of the received UL transmission is much higher than a specific quality threshold, the gNB may determine to increase the current UL rank. If the quality of the received UL transmission is much lower than the specific quality threshold, the gNB may determine to decrease the current UL rank. In an embodiment where there is no significant difference between the quality of the received UL transmission and the specific quality threshold, the gNB may determine not to adjust the current UL rank.

In accordance with some exemplary embodiments, the gNB may randomly choose the TPMI for UL transmission, considering that the gain for TPMI may be limited in the case of a few of transmission antennas (e.g., less than or equal to 4) being employed for the UE.

In accordance with some exemplary embodiments, a UE may be equipped with many antennas. In a scenario where the most-probable UL rank may not have very high probability regarding to other options, the deterministic scheme which can enable UL transmission parameters such as UL rank to be selected based on a predetermined rule (e.g., according to the map shown in Table 1) may not fit well. It may be advantageous to use the learning scheme to statistically build a map between DL and UL transmission parameters.

FIG. 1 is a diagram illustrating an exemplary transmission configuration procedure according to an embodiment of the present disclosure. For simplicity, FIG. 1 only schematically depicts the transmission configuration procedure used by a gNB to determine one or more UL transmission parameters for a UE. It will be appreciated that procedure phases, signaling messages and transmission parameters shown in FIG. 1 are just as examples, and more or less alternative procedure phases, signaling messages and transmission parameters may be involved in the transmission configuration procedure according to the embodiments of the present disclosure.

As shown in FIG. 1, the gNB or any other suitable device/entity can initiate a learning procedure for training DL transmission parameters (e.g., a DL rank/PMI, etc.) to UL transmission parameters (e.g., a UL rank/TPMI, etc.) mapping. In the learning procedure, SRSs may be used periodically to investigate UL channels. Then a map between DL and UL transmission parameters can be derived by supervised machine learning, according to DL measurement reports (e.g., channel quality reports, beam reports, etc.) from UEs.

In accordance with an exemplary embodiment, for a target UE as shown in FIG. 1, the gNB can configure channel state information-reference signal (CSI-RS) transmission for the UE and receive a CSI report including RI/PMI/channel quality indicator (CQI) from the UE. Based at least in part on the map between DL and UL transmission parameters, the gNB can calculate one or more UL transmission parameters such as UL TPMI for the UE, and send downlink control information (DCI) to the UE to indicate the TPMI. The UE may perform UL physical uplink shared channel (PUSCH) codebook based transmission to the gNB by using the indicated TPMI.

In accordance with an exemplary embodiment, the map between DL and UL transmission parameters may be adjusted according to a predetermined rule. For example, even though SRS resources are limited, the gNB may still employ some SRS resources to consistently measure UL channels. Correspondingly, the map between DL and UL transmission parameters can be amended or adapted based on the SRS measurement reflecting the actual UL measurement.

In accordance with an exemplary embodiment, the gNB may configure SRS transmission for adjusting the map between DL and UL transmission parameters according to a specific criterion, so as to effectively use the limited SRS resources. For example, the gNB may assign SRS resources to UEs that are scattered over the cell coverage of the gNB as much as possible. In this example, CSI reports including beam and channel quality reports from the UEs can be used. Optionally, the UE to which the SRS resource is assigned may be able to periodically or frequently transmit SRSs. The transmission of SRSs may be affected by discontinuous reception (DRX) configuration, the UE's buffer status, service types, etc.

Figure 2:
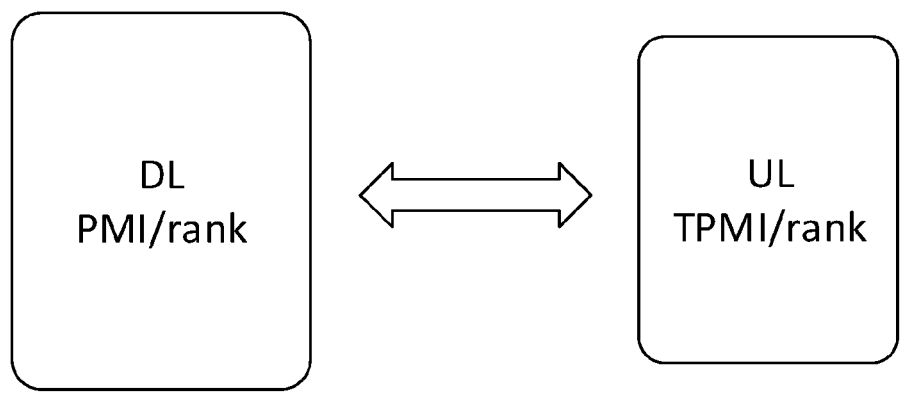
FIG. 2 is a diagram illustrating an exemplary map between DL PMI/rank and UL TPMI/rank according to some embodiments of the present disclosure.

FIG. 2 is a diagram illustrating an exemplary map between DL PMI/rank and UL TPMI/rank according to some embodiments of the present disclosure. From a statistical perspective, a gNB or any other suitable device/entity can determine or obtain mapping from DL PMI and rank to UL TPMI and rank. There may be many possible implementations to achieve mapping between DL PMI/rank and UL TPMI/rank. For example, the mapping between DL PMI/rank and UL TPMI/rank for each UE can be accumulated within a certain period of time. Then, an approach of linear regression may be used to get the most probable UL rank and TPMI for each reported DL rank and PMI, respectively.

It can be appreciated that the map as shown in FIG. 2 may be a one-to-one map, a one-to-multiple map, a multiple-to-one map, or a multiple-to-multiple map. For the cases where the map is not the one-to-one map, the weight for each mapping can be calculated as well. According to an exemplary embodiment, the weight for each mapping can be calculated statistically according to the learning scheme.

Figure 3:
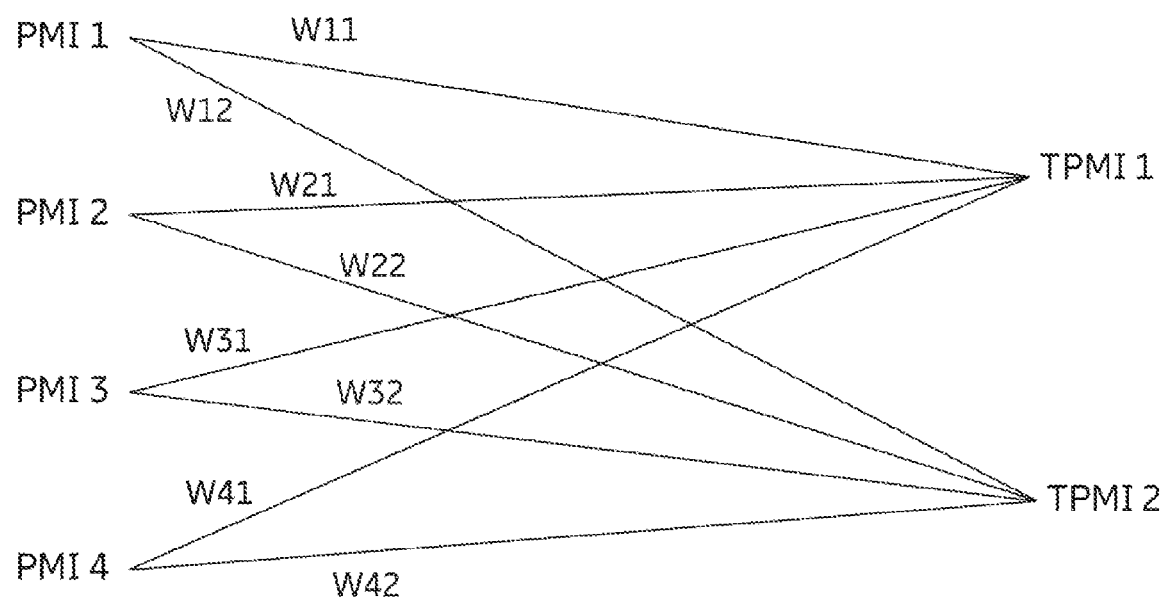
FIG. 3 is a diagram illustrating an example of mapping between PMI and TPMI according to an embodiment of the present disclosure.

FIG. 3 is a diagram illustrating an example of mapping between PMI and TPMI according to an embodiment of the present disclosure. For simplicity, FIG. 3 only schematically depicts the mapping between four DL PMIs {PMI 1, PMI 2, PMI 3, PMI 4} and two UL TPMIs {TPMI 1, TPMI 2} as well as the weight per mapping. As shown in FIG. 3, the weight for the mapping between PMI 1 and TPMI 1 is represented by W11, the weight for the mapping between PMI 1 and TPMI 2 is represented by W12, the weight for the mapping between PMI 2 and TPMI 1 is represented by W21, the weight for the mapping between PMI 2 and TPMI 2 is represented by W22, and so on. It can be appreciated that the mapping between PMIs and TPMIs as well as the corresponding weights shown in FIG. 3 are just as examples, and other proper mapping relationships and weight settings may be employed to implement some embodiments of the present disclosure. In addition, it can be realized that although FIG. 3 merely shows the mapping between PMI and TPMI, the same or similar principle may be applicable to other mapping such as the mapping between DL rank and UL rank.

According to the mapping between DL PMI/rank and UL TPMI/rank, a gNB can determine the UL TPMI/rank for a UE based at least in part on the DL PMI/rank reported by the UE. In accordance with an exemplary embodiment, the maximum UL rank may depend on the minimum of the following values: the DL reported RI, the UE capability (e.g., the maximum UL layers supported by the UE, etc.), and the number of UE transmission antenna(s). The UL rank can be selected from 1 to the maximum UL rank. For each possible UL rank, the gNB can select the highest weighted TPMI according to the reported DL PMI. Then the UL rank and TPMI can be determined according to the weight of each mapping. The gNB can inform the UE of UL transmission configuration indicating the determined UL rank and TPMI with the UL grant (if any). Optionally, the UE may follow the UL transmission configuration for UL codebook-based transmission.

It is noted that some embodiments of the present disclosure are mainly described in relation to LTE or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 4:
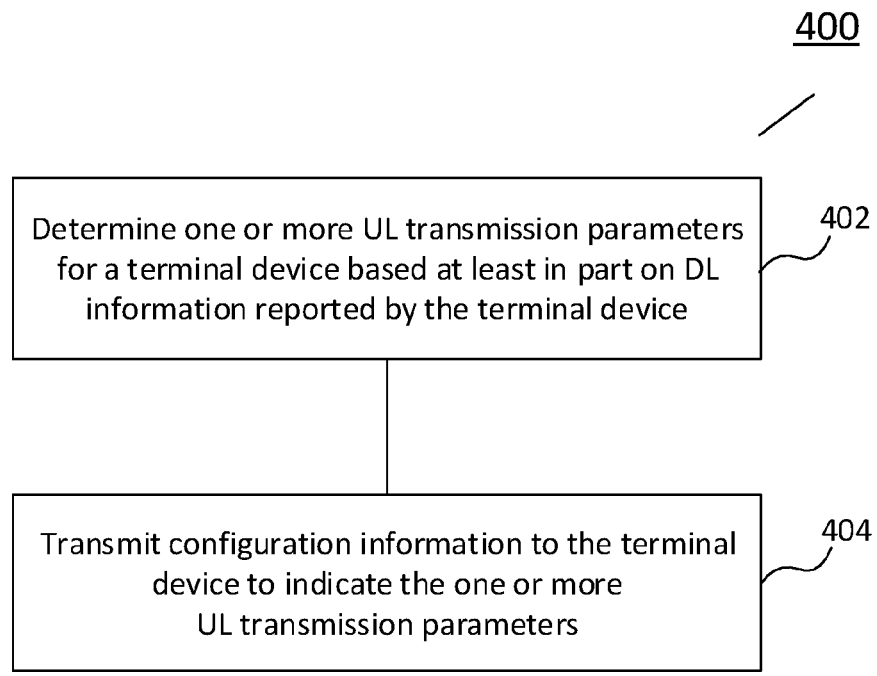
FIG. 4 is a flowchart illustrating a method according to some embodiments of the present disclosure.

FIG. 4 is a flowchart illustrating a method 400 according to some embodiments of the present disclosure. The method 400 illustrated in FIG. 4 may be performed by a network node or an apparatus communicatively coupled to the network node. In accordance with an exemplary embodiment, the network node may comprise a BS, an AP, a transmission point or any other suitable entity which may be capable of serving one or more terminal devices such as UEs according to specific communication configuration.

According to the exemplary method 400 illustrated in FIG. 4, the network node can determine one or more UL transmission parameters for a terminal device based at least in part on DL information reported by the terminal device, as shown in block 402. In some exemplary embodiments, the terminal device may be configured (e.g., by the network node) to perform SRS transmission at a frequency lower than a first threshold. Optionally, the first threshold may be set as a normal frequency at which a conventional UE transmits SRSs to a gNB. Alternatively or additionally, the terminal device may be configured not to perform the SRS transmission. The configuration of SRS transmission may be provided to the terminal device by signaling from the network node or predefined network settings. According to some exemplary embodiments, the one or more UL transmission parameters determined by the network node may comprise at least one of an UL transmission rank and a TPMI.

In accordance with some exemplary embodiments, the one or more UL transmission parameters for the terminal device may be further based at least in part on one or more of:

- capability of the terminal device (e.g., the number of antennas, supported transmission mode, supported scheduling configuration, the maximum supported UL layers, etc.);
- UL measurement for the terminal device (e.g., channel condition/signal quality/SINR measured for UL transmission);
- UL power headroom of the terminal device (e.g., a power indicator included in a UL power headroom report);
- DL transmission feedback from the terminal device (e.g., HARQ feedback for DL transmission);
- a difference between UL transmission and DL transmission of the terminal device (e.g., SINR/power/interference difference between UL and DL transmissions);
- a difference between effective quality and estimated quality of the UL transmission of the terminal device (e.g., a difference between effective SINR and estimated SINR related to UL transmission); and
- a type of a service for the terminal device (e.g., a service with a big/small buffer, a periodic/non-periodic service, etc.).

Correspondingly, the network node can determine the one or more UL transmission parameters for the terminal device further based at least in part on one or more factors above. It can be appreciated that other possible factors may also affect the determination of the one or more UL transmission parameters for the terminal device. In accordance with some exemplary embodiments, the determination of the one or more UL transmission parameters for the terminal device based at least in part on the DL information reported by the terminal device may comprise: determining the one or more UL transmission parameters, according to a map (e.g., the map shown in Table 1, FIG. 2 and FIG. 3) between the one or more UL transmission parameters (e.g., a UL rank/TPMI, etc.) and one or more DL transmission parameters (e.g., a DL rank/PMI, etc.) indicated by the DL information.

In accordance with some exemplary embodiments, the map between the one or more UL transmission parameters and the one or more DL transmission parameters may comprise: mapping from the one or more DL transmission parameters to the one or more UL transmission parameters, and optionally a weight per mapping. According to an exemplary embodiment, the weight per mapping may meet a specific criterion (e.g., the weight of the mapping corresponding to the determined parameter is larger than that of any other candidate mapping).

In accordance with some exemplary embodiments, the map between the one or more UL transmission parameters and the one or more DL transmission parameters may be determined according to statistical information related to UL transmission and DL transmission. For example, the statistical information can be collected according to measurements on UL transmission and the associated DL transmission for a period of time. Alternatively or additionally, the statistical information can be determined according to experienced values and/or a hypothetical model. In some exemplary embodiments, a deterministic scheme, a learning scheme, or a combination thereof may be used to derive/build the map between the one or more UL transmission parameters and the one or more DL transmission parameters.

According to the exemplary method 400 illustrated in FIG. 4, the network node can transmit configuration information to the terminal device to indicate the one or more UL transmission parameters, as shown in block 404. Optionally, the configuration information may be transmitted together with scheduling signaling for the terminal device or separately.

In accordance with some exemplary embodiments, the terminal device may be equipped with one or more antennas. In the case that the number of the one or more antennas of the terminal device is less than or equal to a third threshold (e.g., 4, 6 or any other proper value), the network node can randomly select a TPMI for UL transmission of the terminal device. Correspondingly, the configuration information from the network node can indicate the randomly selected TPMI for the UL transmission of the terminal device.

In accordance with some exemplary embodiments, the network node can receive UL transmission from the terminal device. The one or more UL transmission parameters indicated by the configuration information may be applied to the UL transmission of the terminal device. Optionally, the network node may adjust the one or more UL transmission parameters determined for the terminal device, based at least in part on the received UL transmission from the terminal device. The one or more adjusted UL transmission parameters may be informed to the terminal device by the network node.

In accordance with some exemplary embodiments, the network node may instruct the terminal device to transmit an SRS (or multiple SRSs) to the network node, in response that quality of the received UL transmission is lower than a second threshold (e.g., for the case that SINR of the UL transmission is lower than a SINR threshold). Based at least in part on the SRS transmission of the terminal device, the network node can perform SRS measurement to actually evaluate a UL channel of the terminal device.

In accordance with some exemplary embodiments, the map between the one or more UL transmission parameters and the one or more DL transmission parameters may be updated according to SRS measurement performed by the network node. According to an exemplary embodiment, the SRS measurement may be performed for one or more terminal devices scattered over a cell coverage of the network node. Alternatively or additionally, SRS resources may be assigned to some specific terminal devices, so that the SRS measurement and the update of the map between UL and DL transmission parameters can be performed for at least a part of the terminal devices served by the network node. Optionally, the SRS measurement may be performed periodically or as required.

Figure 5:
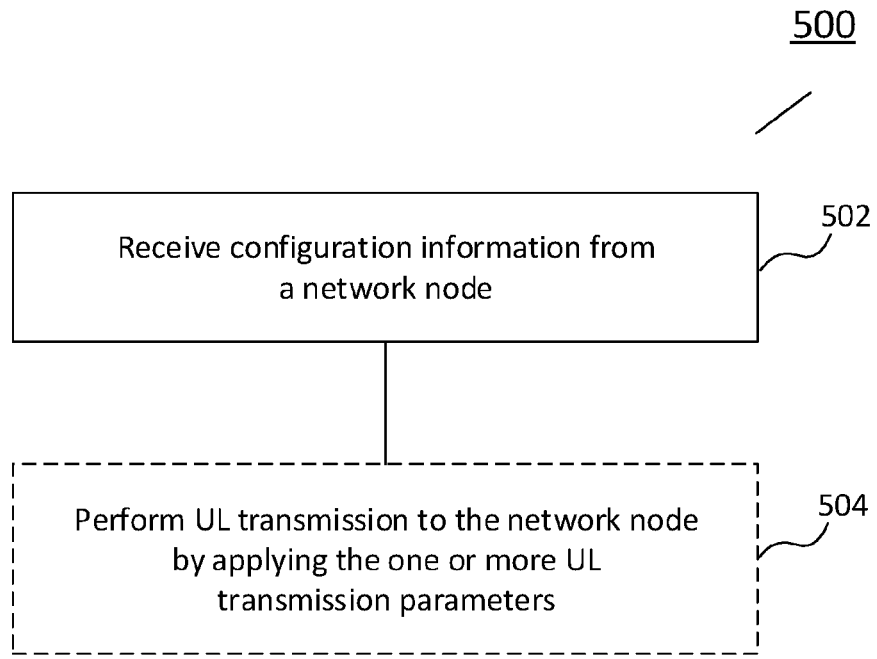
FIG. 5 is a flowchart illustrating another method according to some embodiments of the present disclosure.

FIG. 5 is a flowchart illustrating a method 500 according to some embodiments of the present disclosure. The method 500 illustrated in FIG. 5 may be performed by a terminal device or an apparatus communicatively coupled to the terminal device. In accordance with an exemplary embodiment, the terminal device such as UE may be capable of communicating with a network node (e.g., a BS, an AP, a transmission point, etc.) according to specific communication configuration. It can be appreciated that operations/steps of the method 500 illustrated in FIG. 5 may correspond to operations/steps of the method 400 illustrated in FIG. 4. The network node described in connection with FIG. 4 can perform the method 400 to determine at least partly UL transmission configuration for the terminal device as described in connection with FIG. 5.

According to the exemplary method 500 illustrated in FIG. 5, the terminal device can receive configuration information from a network node, as shown in block 502. The configuration information may indicate one or more UL transmission parameters which may be based at least in part on DL information reported to the network node by the terminal device. It can be appreciated that the configuration information received by the terminal device as described in block 502 may correspond to the configuration information transmitted by the network node as described in block 404. Correspondingly, there may be a map between the one or more UL transmission parameters and one or more DL transmission parameters indicated by the DL information, as described with respect to FIG. 4.

In accordance with some exemplary embodiments, the terminal device may be configured, for example, by the network node, to perform SRS transmission less frequently. For example, the terminal device may be assigned an amount of SRS resources lower than a normal level. Optionally, the terminal device may be configured not to perform the SRS transmission. Although the terminal device may be configured to transmit less SRSs or even not transmit an SRS, the one or more UL transmission parameters (e.g., a UL transmission rank, a TPMI, etc.) can be determined according to the map between UL and DL transmission parameters, and optionally other information (e.g., measurement/capability/service information, etc.) related the terminal device.

In accordance with some exemplary embodiments, the configuration information received from the network node may be related to the capability of the terminal device. For example, in an embodiment where the terminal device is equipped with a few of antennas (e.g., less than or equal to 4 antennas), the configuration information may indicate a TPMI randomly selected for UL transmission of the terminal device. In this case, the configuration information may further indicate a UL rank selected for the terminal device by the network node according to a map between the DL rank reported by the terminal device and the UL rank. According to another embodiment where the terminal device is equipped with more antennas (e.g., more than 4 antennas), the configuration information may indicate the UL rank and TPMI selected for the terminal device by the network node according to mapping from the reported DL rank/PMI to the UL rank/TPMI.

Optionally, the terminal device can perform UL transmission to the network node by applying the one or more UL transmission parameters, as shown in block 504. In accordance with some exemplary embodiments, the terminal device can obtain one or more adjusted UL transmission parameters from the network node. The one or more adjusted UL transmission parameters may be based at least in part on the UL transmission of the terminal device received by the network node. Optionally, the terminal device may receive an instruction from the network node to transmit an SRS to the network node, for example, in response that quality of the UL transmission of the terminal device received by the network node is lower than a second threshold (e.g., SINR threshold). According to the instruction, the terminal device can transmit the SRS to the network node.

As described in connection with FIG. 4, the map between UL and DL transmission parameters may be updated according to SRS measurement performed by the network node (e.g., periodically, in response to a specific event, or as required). The SRS measurement may be performed for the terminal device and optionally one or more other terminal devices scattered over the cell coverage of the network node.

The proposed solution according to some exemplary embodiments can enable a network node such as a base station to determine UL transmission parameters (e.g., a UL rank, a TPMI, etc.) for a terminal device such as a UE according to a map between UL and DL transmission parameters, for example, in the case of less or no assignment of SRS resources to the terminal device. Various embodiments may be applicable to terminal devices with different capabilities (e.g., equipped with different numbers of antennas, supporting different scheduling configuration, operating in different transmission modes, etc.). Optionally, the map between UL and DL transmission parameters may be adjusted or updated adaptively. The proposed solution can advantageously improve network performance and enhance resource efficiency, without significantly increasing complexity of implementation.

The various blocks shown in FIGS. 4-5 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 6:
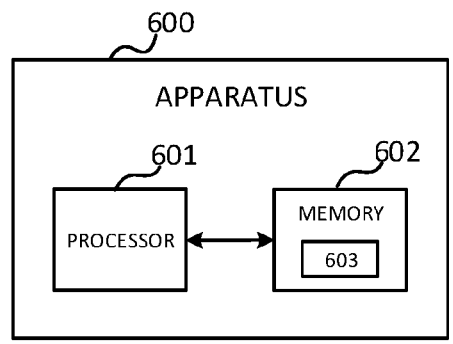
FIG. 6 is a block diagram illustrating an apparatus according to some embodiments of the present disclosure.

FIG. 6 is a block diagram illustrating an apparatus 600 according to various embodiments of the present disclosure. As shown in FIG. 6, the apparatus 600 may comprise one or more processors such as processor 601 and one or more memories such as memory 602 storing computer program codes 603. The memory 602 may be non-transitory machine/processor/computer readable storage medium. In accordance with some exemplary embodiments, the apparatus 600 may be implemented as an integrated circuit chip or module that can be plugged or installed into a network node as described with respect to FIG. 4, or a terminal device as described with respect to FIG. 5. In such case, the apparatus 700 may be implemented as a network node as described with respect to FIG. 4, or a terminal device as described with respect to FIG. 5.

In some implementations, the one or more memories 602 and the computer program codes 603 may be configured to, with the one or more processors 601, cause the apparatus 600 at least to perform any operation of the method as described in connection with FIG. 4. In other implementations, the one or more memories 602 and the computer program codes 603 may be configured to, with the one or more processors 601, cause the apparatus 600 at least to perform any operation of the method as described in connection with FIG. 5.

Alternatively or additionally, the one or more memories 602 and the computer program codes 603 may be configured to, with the one or more processors 601, cause the apparatus 600 at least to perform more or less operations to implement the proposed methods according to the exemplary embodiments of the present disclosure.

Figure 7:
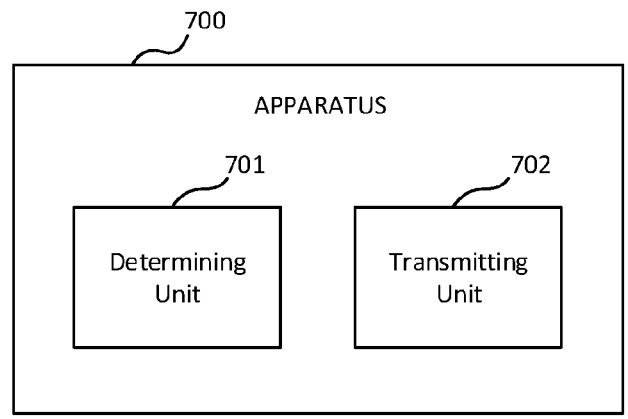
FIG. 7 is a block diagram illustrating another apparatus according to some embodiments of the present disclosure.

FIG. 7 is a block diagram illustrating an apparatus 700 according to some embodiments of the present disclosure. As shown in FIG. 7, the apparatus 700 may comprise a determining unit 701 and a transmitting unit 702. In an exemplary embodiment, the apparatus 700 may be implemented as a network node (such as the network node described with respect to FIG. 4). The determining unit 701 may be operable to carry out the operation in block 402, and the transmitting unit 702 may be operable to carry out the operation in block 404. Optionally, the determining unit 701 and/or the transmitting unit 702 may be operable to carry out more or less operations to implement the proposed methods according to the exemplary embodiments of the present disclosure.

Figure 8:
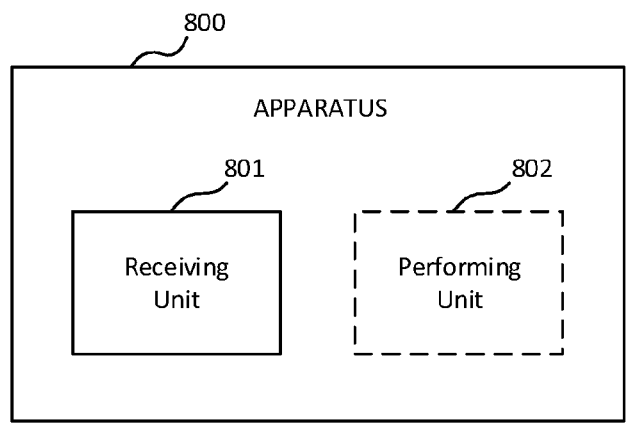
FIG. 8 is a block diagram illustrating yet another apparatus according to some embodiments of the present disclosure.

FIG. 8 is a block diagram illustrating an apparatus 800 according to some embodiments of the present disclosure. As shown in FIG. 8, the apparatus 800 may comprise a receiving unit 801 and optionally a performing unit 802. In an exemplary embodiment, the apparatus 800 may be implemented as a terminal device (such as the terminal device described with respect to FIG. 5). The receiving unit 801 may be operable to carry out the operation in block 502, and the performing unit 802 may be operable to carry out the operation in block 504. Optionally, the receiving unit 801 and/or the performing unit 802 may be operable to carry out more or less operations to implement the proposed methods according to the exemplary embodiments of the present disclosure.

Figure 9:
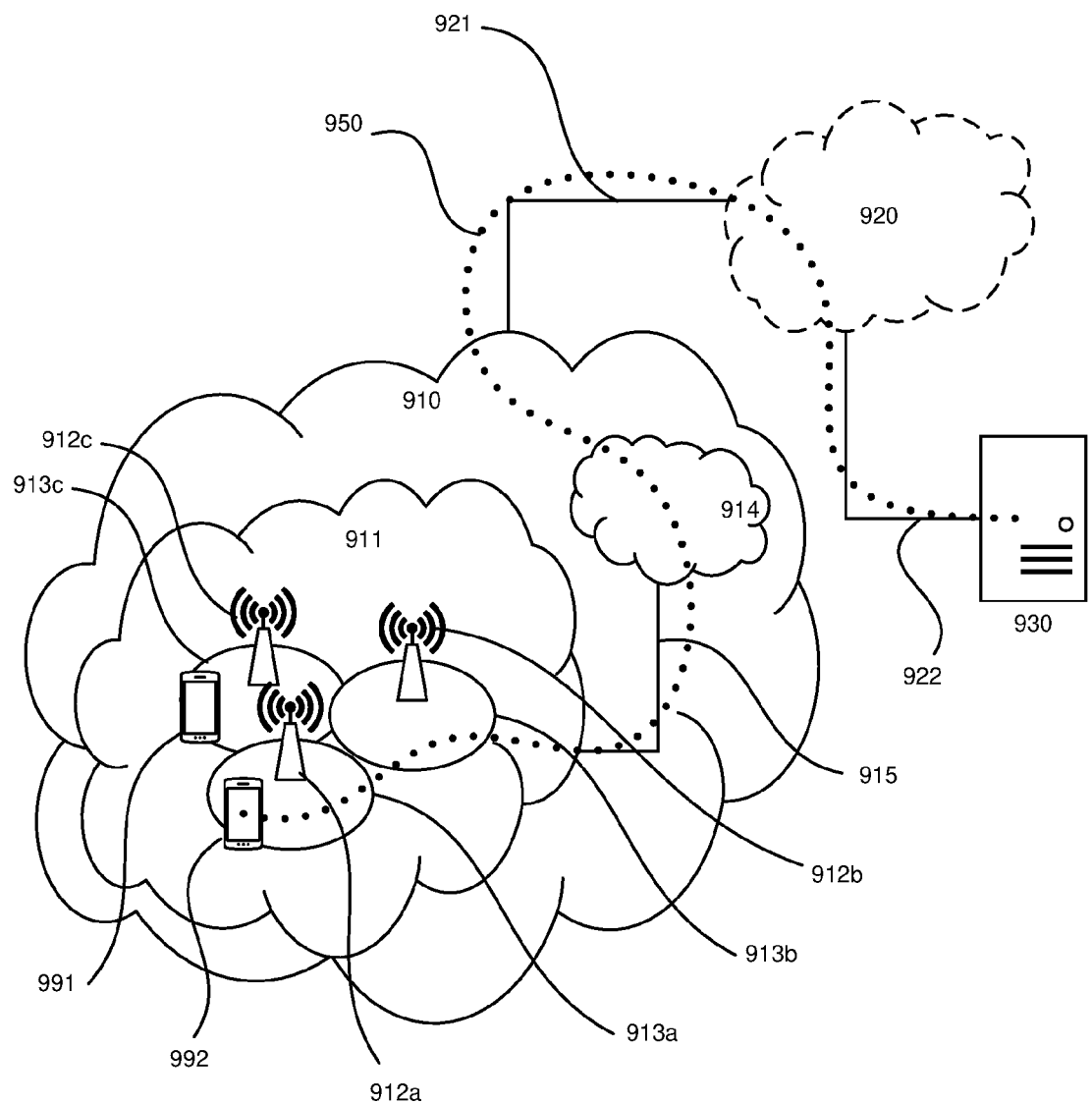
FIG. 9 is a block diagram illustrating a telecommunication network connected via an intermediate network to a host computer in accordance with some embodiments of the present disclosure.

FIG. 9 is a block diagram illustrating a telecommunication network connected via an intermediate network to a host computer in accordance with some embodiments of the present disclosure.

With reference to FIG. 9, in accordance with an embodiment, a communication system includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first UE 991 located in a coverage area 913c is configured to wirelessly connect to, or be paged by, the corresponding base station 912c. A second UE 992 in a coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. Connections 921 and 922 between the telecommunication network 910 and the host computer 930 may extend directly from the core network 914 to the host computer 930 or may go via an optional intermediate network 920. An intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, the base station 912 may not or need not be informed about the past routing of an incoming downlink communication with data originating from the host computer 930 to be forwarded (e.g., handed over) to a connected UE 991. Similarly, the base station 912 need not be aware of the future routing of an outgoing uplink communication originating from the UE 991 towards the host computer 930.

Figure 10:
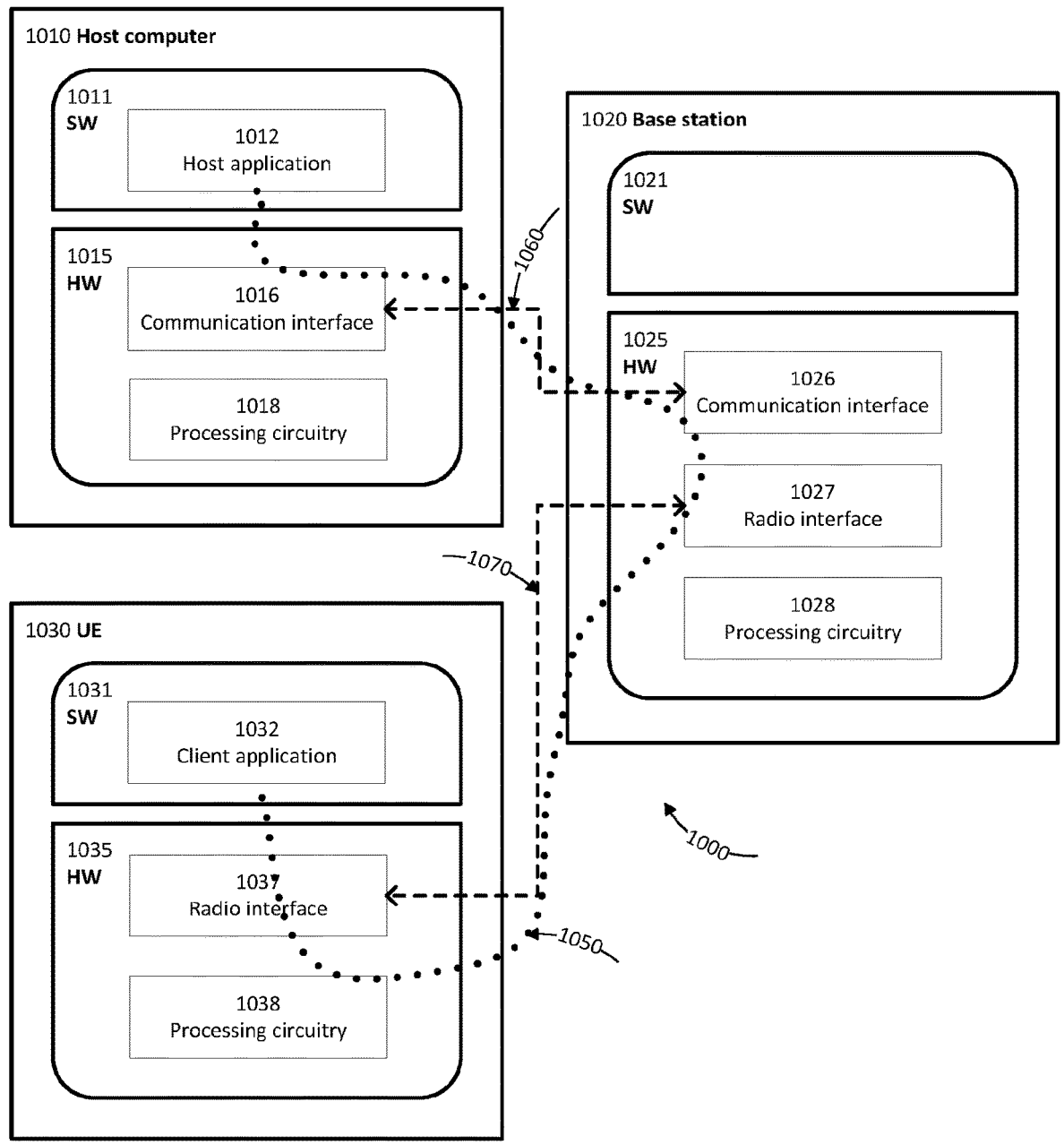
FIG. 10 is a block diagram illustrating a host computer communicating via a base station with a UE over a partially wireless connection in accordance with some embodiments of the present disclosure.

FIG. 10 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises a processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with the UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes a processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes a processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

It is noted that the host computer 1010, the base station 1020 and the UE 1030 illustrated in FIG. 10 may be similar or identical to the host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the UE 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

Wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 1050 between the host computer 1010 and the UE 1030, in response to variations in the measurement results. The measurement procedure and/or the network functionality for reconfiguring the OTT connection 1050 may be implemented in software 1011 and hardware 1015 of the host computer 1010 or in software 1031 and hardware 1035 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which the software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer 1010's measurements of throughput, propagation times, latency and the like. The measurements may be implemented in that the software 1011 and 1031 causes messages to be transmitted, in particular empty or 'dummy' messages, using the OTT connection 1050 while it monitors propagation times, errors etc.

Figure 11:
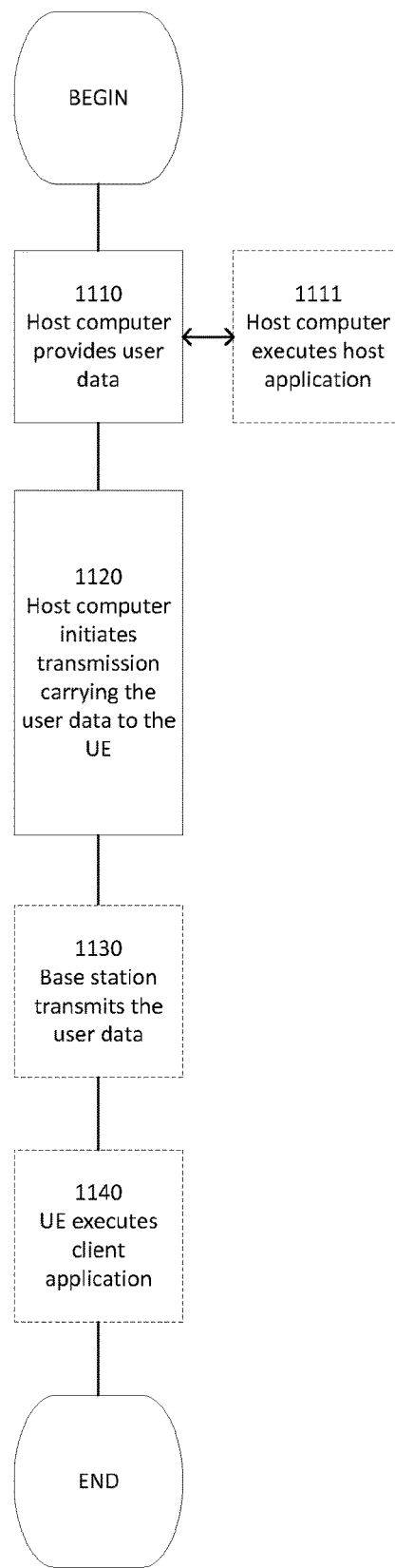
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
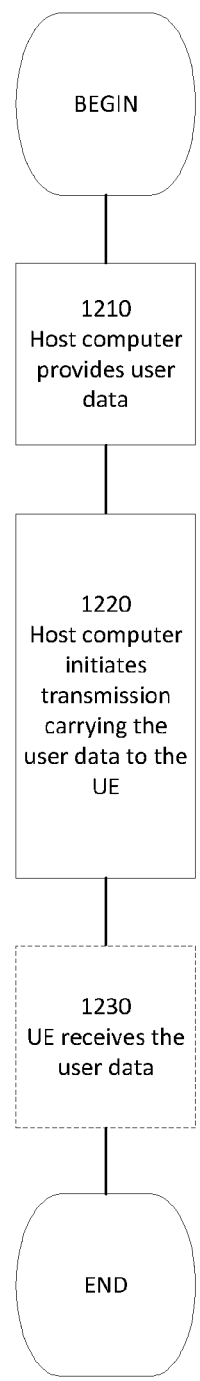
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
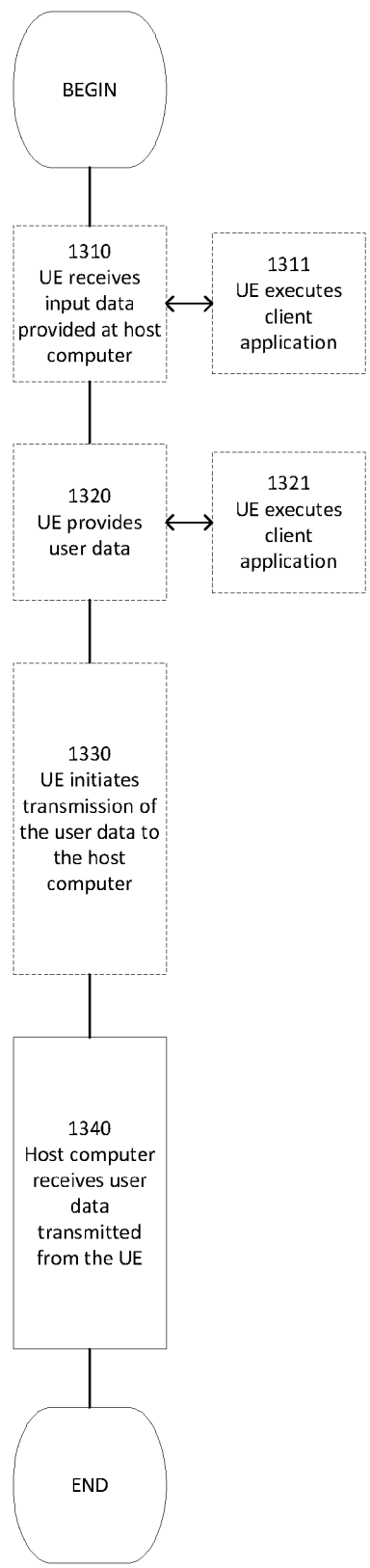
FIG. 13 is a flowchart illustrating a method implemented in a communication system, in accordance with an embodiment of the present disclosure.

FIG. 13 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
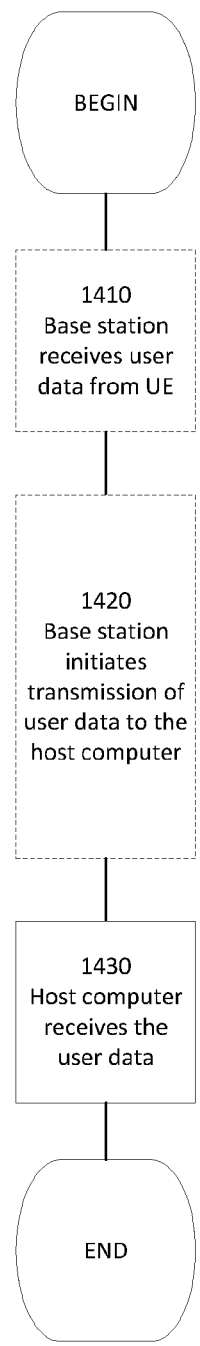
FIG. 14 is a flowchart illustrating a method implemented in a communication system, in accordance with an embodiment of the present disclosure.

FIG. 14 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the exemplary method 400 as describe with respect to FIG. 4.

According to some exemplary embodiments, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the exemplary method 400 as describe with respect to FIG. 4.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the exemplary method 500 as describe with respect to FIG. 5.

According to some exemplary embodiments, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the exemplary method 500 as describe with respect to FIG. 5.

According to some exemplary embodiments, there is provided a method implemented in a communication system which may include a host computer, a base station and a UE. The method may comprise, at the host computer, receiving user data transmitted to the base station from the UE which may perform any step of the exemplary method 500 as describe with respect to FIG. 5.

According to some exemplary embodiments, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the exemplary method 500 as describe with respect to FIG. 5.

According to some exemplary embodiments, there is provided a method implemented in a communication system which may include a host computer, a base station and a UE. The method may comprise, at the host computer, receiving, from the base station, user data originating from a transmission which the base station has received from the UE. The base station may perform any step of the exemplary method 400 as describe with respect to FIG. 4.

According to some exemplary embodiments, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the exemplary method 400 as describe with respect to FIG. 4.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a network node, the method comprising:
   receiving downlink information reported by a terminal device;
   based at least in part on the received downlink information reported by the terminal device, determining one or more uplink transmission parameters for the terminal device according to a map between the one or more uplink transmission parameters and one or more downlink transmission parameters indicated by the received downlink information; and
   after determining the one or more uplink transmission parameters, transmitting configuration information to the terminal device to indicate the one or more uplink transmission parameters, wherein
   the terminal device is configured by the network node to perform sounding reference signal transmission at a frequency lower than a threshold, or not to perform the sounding reference signal transmission.

2. The method of claim 1, wherein the map between the one or more uplink transmission parameters and the one or more downlink transmission parameters comprises:
   one or more mappings from the one or more downlink transmission parameters to the one or more uplink transmission parameters; and
   a weight per mapping.

3. The method of claim 2, wherein the weight per mapping meets a specific criterion.

4. The method of claim 1, wherein the map between the one or more uplink transmission parameters and the one or more downlink transmission parameters is determined according to statistical information related to uplink transmission and downlink transmission.

5. The method of claim 1, wherein the one or more uplink transmission parameters for the terminal device are further based at least in part on one or more of:
   capability of the terminal device;
   uplink measurement for the terminal device;
   uplink power headroom of the terminal device;
   downlink transmission feedback from the terminal device;
   a difference between uplink transmission and downlink transmission of the terminal device;
   a difference between effective quality and estimated quality of the uplink transmission of the terminal device; and
   a type of a service for the terminal device.

6. The method of claim 1, wherein the one or more uplink transmission parameters comprise at least one of an uplink transmission rank and a transmission precoding matrix indicator.

7. The method of claim 1, further comprising:
   receiving, from the terminal device, uplink transmission to which the one or more uplink transmission parameters are applied.

8. The method of claim 7, further comprising:
   adjusting the one or more uplink transmission parameters, based at least in part on the received uplink transmission from the terminal device; and
   informing the terminal device of the one or more adjusted uplink transmission parameters.

9. The method of claim 7, further comprising:
   instructing the terminal device to transmit a sounding reference signal to the network node, in response that quality of the received uplink transmission is lower than a threshold.

10. The method of claim 1, wherein the terminal device is equipped with one or more antennas of which a number is less than or equal to a threshold.

11. The method of claim 10, wherein the configuration information indicates a transmission precoding matrix indicator which is randomly selected by the network node for uplink transmission of the terminal device.

12. The method of claim 1, wherein the map between the one or more uplink transmission parameters and the one or more downlink transmission parameters is updated according to sounding reference signal measurement performed by the network node.

13. The method of claim 12, wherein the sounding reference signal measurement is performed for one or more terminal devices scattered over a cell coverage of the network node.

14. The method of claim 12, wherein the sounding reference signal measurement is performed periodically.

15. A method performed by a terminal device, the method comprising:
   reporting downlink information to a network node; and after reporting the downlink information to the network node, receiving configuration information from the network node, wherein the configuration information indicates one or more uplink transmission parameters which are based at least in part on the downlink information reported to the network node by the terminal device, and the one or more uplink transmission parameters are determined according to a map between the one or more uplink transmission parameters and one or more downlink transmission parameters indicated by the downlink information, wherein the terminal device is configured by the network node to perform sounding reference signal transmission at a frequency lower than a threshold, or not to perform the sounding reference signal transmission.

16. A network node comprising:

one or more processors; and one or more memories storing computer program codes, wherein the network node is configured to:

receive downlink information reported by a terminal device;

based at least in part on the received downlink information reported by the terminal device, determine one or more uplink transmission parameters for the terminal device according to a map between the one or more uplink transmission parameters and one or more downlink transmission parameters indicated by the received downlink information; and after determining the one or more uplink transmission parameters, transmit configuration information to the terminal device to indicate the one or more uplink transmission parameters, wherein the terminal device is configured by the network node to perform sounding reference signal transmission at a frequency lower than a threshold, or not to perform the sounding reference signal transmission.

* * * * *